Patented June 6, 1944

2,350,903

UNITED STATES PATENT OFFICE 2,350,903

COFFEE EXTRACT

John L. Kellogg, Chicago, Ill., assignor, by mesne assignments, to John L. Kellogg & Co., Chicago, Ill., a corporation of Illinois No Drawing. Application January 3, 1942,
Serial No. 425,551

4 Claims. (Cl. 99—71)

This invention relates to coffee extracts and similar beverage extracts and, more especially, to soluble, dried or pulverulent coffee extracts, from which the coffee beverages may be made by adding water, hot or cold; although the invention is applicable also to the production of coffee extracts in liquid form.

The primary object of the invention is to improve the flavor and aroma of the beverages made from such coffee extracts, so that they will have, as nearly as may be, the flavor and aroma characteristics of beverages made directly from roasted and ground coffee beans.

This result may be accomplished by incorporating with the extract a small amount of coffee oil to compensate for the losses of flavor and aroma characteristics incident to the extraction, evaporation and other procedures necessary for making the extract. However, if this is done, the product is likely in time to develop rancidity.

According to the present invention, there is incorporated with the extract a mixture of natural coffee oil and a hydrogenated vegetable oil which is preferably, but not necessarily, hydrogenated coffee oil. It has been found that even a small amount of hydrogenated oil, small in comparison with the amount of coffee oil used, will effectively inhibit the development of rancidity in the product.

If it is desired to have a product which consists wholly of coffee material, the hydrogenated oil used will be hydrogenated coffee oil. However, the primary object of the present invention may be accomplished by using any hydrogenated, edible vegetable oil, such as cotton seed oil, corn oil and the like.

It will be understood that it is the natural coffee oil which gives the improved flavor and aroma characteristics to the product and to beverages made therefrom. Coffee oil, when hydrogenated, has little, if any, flavor or aroma.

The natural coffee oil is preferably added to the extract, but, less desirably, might be introduced into the coffee material at some earlier stage of the process.

The invention may be employed in connection with any extracting process, for example, in connection with the extracting processes shown in United States applications to John L. Kellogg, Serial No. 412,898, filed September 29, 1941 (as a continuation in part of Serial No. 338,876, filed June 5, 1940); Serial No. 362,819, filed October 25, 1940; and Serial No. 408,052, filed August 23, 1941. The present invention is not, however, limited in its use to these particular extracting processes.

A suitable amount of natural coffee oil to be added to the dry extract is about 0.25%, by weight, of the coffee. This may vary from 0.125% to 2.0%, the range being practical and not critical, and depending upon the flavor and aroma characteristics desired in the beverage made from the extract.

Preferably the hydrogenated oil is used in smaller quantities. The preferred ratio of hydrogenated oil to the natural coffee oil is about 1 to 4. This ratio may vary between 1 to 16 and 1 to 2 of the natural coffee oil. This range is practical and not critical.

If hydrogenated coffee oil, or other hydrogenated oil, has been introduced into the coffee material at earlier stages of the process as described, for example, in United States application of John L. Kellogg, Serial No. 375,542, filed January 21, 1941, the amount of hydrogenated oil added to the extract in accordance with the present invention may be proportionately reduced.

The present invention might also be used to advantage in the production of so-called coffee substitutes, that is, vegetable extracts from roasted wheat, rye, bran, malt, caramelized sugar, malt extract and molasses, or other roasted vegetable matter used for producing extracts from which coffee-like beverages can be made. In such case a closer approximation to the flavor and aroma of coffee can be obtained by adding to the material, preferably to the dried and powdered extract, a small amount of coffee oil and with it a small amount of a hydrogenated vegetable oil as described above in connection with the treatment of coffee extracts.

I claim:

1. Coffee extract containing, by weight, dry substance basis, from 0.125% to 2.0% of added natural coffee oil and a hydrogenated vegetable oil in the proportion of 1 to 16—1 to 4 of the added natural coffee oil.

2. Pulverulent, soluble coffee extract containing from 0.125% to 2.0% of added natural coffee oil and a hydrogenated vegetable oil in the proportion of about 1 to 4, by weight, of the natural coffee oil.

3. Improvement in the process of making pulverulent coffee extracts which comprises: adding to the dried coffee extract about 0.125% to 2.0%, by weight, of natural coffee oil and about ¼ as much of a hydrogenated vegetable oil.

4. Beverage extract made from roasted cereal material which contains about 0.125% to 2.0% of natural coffee oil and about one-fourth as much of a hydrogenated edible vegetable oil.

JOHN L. KELLOGG.